(No Model.)
H. J. SEYMOUR.
ANIMAL TRAP.
No. 407,129. Patented July 16, 1889.
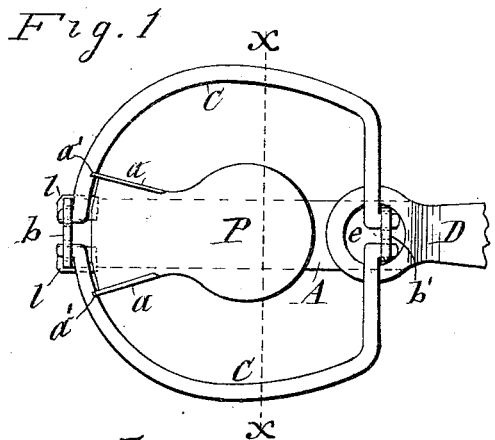
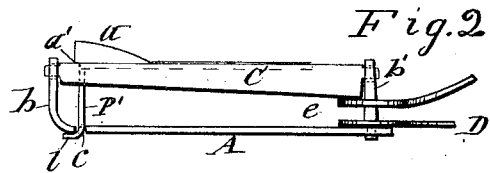
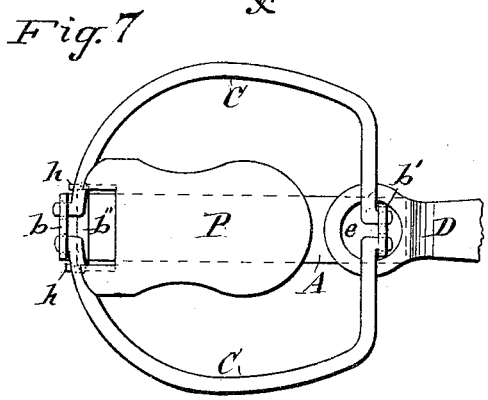
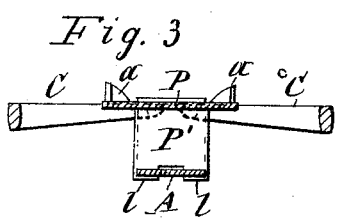
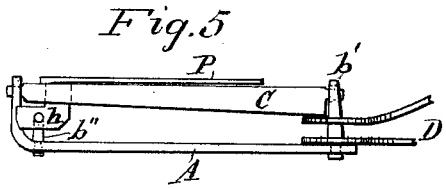
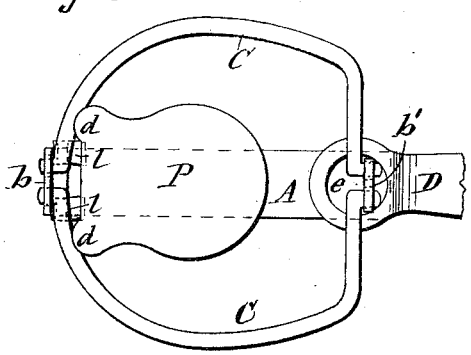
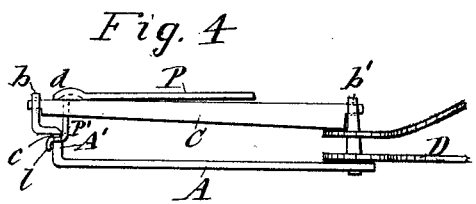
Witnesses
C. L. Bendixon
A. F. Walz
Inventor
Henry J. Seymour
By his Attorneys

UNITED STATES PATENT OFFICE.

HENRY JOSEPH SEYMOUR, OF NIAGARA, ONTARIO, CANADA.

ANIMAL-TRAP.

SPECIFICATION forming part of Letters Patent No. 407,129, dated July 16, 1889.

Application filed January 7, 1889. Serial No. 295,653. (No model.)

*To all whom it may concern:*

Be it known that I, HENRY JOSEPH SEYMOUR, of Niagara, in the Province of Ontario, in the Dominion of Canada, have invented new and useful Improvements in Animal-Traps, of which the following, taken in connection with the accompanying drawings, is a full, clear, and exact description.

This invention relates to the class of animal-traps in which spring-actuated jaws are hinged to the supporting-frame of the trap and close over a bait-pan, which is also hinged to the said supporting-frame, and a catch or latch holds both the bait-pan and jaws in their set position.

My invention consists, first, in the improved device for holding both jaws of the trap in their set position, and, secondly, in an improved form of the spring which allows said spring to be turned into such an angle from the supporting-frame of the trap as to sustain the same in its horizontal position without straining the jaws of the trap, all as hereinafter more fully explained, and specifically set forth in the claims.

In the annexed drawings, Figure 1 is a top plan view of a set trap embodying my improvements. Fig. 2 is an edge view of the same. Fig. 3 is a transverse section on line $x$ $x$, Fig. 1. Figs. 4 and 5 are edge views of the bait-pan and its connection with the frame, illustrating modifications of said parts; and Figs. 6 and 7 are top plan views of said modifications.

Similar letters of reference indicate corresponding parts.

A represents the base or main supporting-frame of the trap, consisting of an elongated plate which is provided at opposite ends with rigid posts $b$ $b'$, to which the jaws C C are hinged in the usual and well-known manner.

D denotes the spring which actuates said jaws. It is of the usual V shape and hung at one end on the post $b'$, and formed at the opposite end with an eye $e$, by which it encircles the end portion of the jaws hinged to said post.

In setting the trap, as illustrated in Fig. 1 of the drawings, the spring D is usually turned into an angle from the frame A for the purpose of supporting the trap in a horizontal position. In order to allow the spring to be swung into the aforesaid position without causing the eye $e$ thereof to bind on the jaws C C and strain the same, I bend the end portion of the spring containing the eye $e$ so as to bring it into a plane approximately parallel with that of the frame A, as shown in Fig. 2 of the drawings.

P designates the bait-pan, which I hang on one end of the frame A in proximity to the hinged ends of the jaws C C, and preferably hinge it to the base or main portion of the frame by providing the side edges of the latter with notches $c$ $c$ in proximity to the post $b$, and forming the bait-pan with a downward extension P', terminating with lugs $l$ $l$, which pass through the aforesaid notches and have their protruding ends upset or bent, so as to retain the lugs in the notches. The end of the bait-pan adjacent to the extension P' is formed with upward projecting flanges $a$ $a$ on its side edges, and the ends of these flanges project rearward from the bait-pan, as shown at $a'$, to serve as catches for engaging the tops of the jaws C C, when in their set position, as shown in Figs. 1 and 2 of the drawings. The flanges $a$ $a$ serve to stiffen the bait-pan, and the bearing of the thin edges of the projections $a'$ $a'$ on the jaws reduces the frictional hold thereof to a minimum, and thus renders the action of the trap very sensitive.

Although I prefer the aforesaid construction and attachment of the bait-pan, yet I do not wish to be limited specifically in this respect, inasmuch as the same is susceptible of several modifications, as illustrated in Figs. 4, 5, 6, and 7 of the drawings.

In the construction shown in Figs. 4 and 6 of the drawings the frame A is formed with a vertical offset A' between the base and post $b$, and the said offset is provided with the notches $c$ $c$, for the reception of the lugs $l$ $l$ of the bait-pan P, and the end of the bait-pan adjacent to the extension P' is formed with horizontal rearward-projecting lips $d$, which engage the tops of the jaws when in their set position.

Figs. 5 and 7 of the drawings show the frame A, provided with an extra post $b''$, and the bait-pan is formed with downward-projecting perforated ears $h$ $h$, by which it is hinged to the post $b''$. The bait-pan proper engages the jaws in the same manner, as illustrated in Figs. 4 and 6 of the drawings.

What I claim as new, and desire to secure by Letters Patent, is—

1. In an animal-trap, the combination of the frame A, provided with posts $b$ $b'$ and with the notches $c$ $c$ in the edges of the frame in proximity to one of said posts, the jaws C C, hinged to said posts, and the bait-pan P, formed with lugs $l$ $l$, passing through the said notches and upset or bent at their protruding ends, and two catches integral with the side edges of the bait-pan and engaging the two jaws when in their set position, as set forth.

2. In an animal-trap, the combination of the frame A, provided with posts $b$ $b'$ and with the notches $c$ $c$ in the edges of the base of one of the posts, the jaws C C, hinged to said posts, and the bait-pan P, formed with the downward extension P', terminating with lugs $l$ $l$, passing through the aforesaid notches and upset or bent at their protruding ends, and the flanges $a$ $a$, integral with the bait-pan and formed with rearward projections $a'$ $a'$, engaging and holding both jaws in their set position, substantially as described and shown.

3. In combination with the frame A, provided with posts $b$ $b'$, and the jaws hinged to said posts, the spring D, hung at one end on the post $b'$ and having its opposite end in a plane approximately parallel with that of the frame A and encircling the hinged ends of the jaws adjacent to said post, substantially as and for the purpose set forth.

In testimony whereof I have hereunto signed my name, in the presence of two witnesses, at Niagara Falls, in the county of Niagara, in the State of New York, this 22d day of December, 1888.

HENRY JOSEPH SEYMOUR. [L. S.]

Witnesses:
F. I. PIERCE,
JAMES MOAKLER.